Feb. 13, 1923.
C. G. RYDEEN.
DRIVING ATTACHMENT.
FILED JUNE 30, 1921.
1,445,241.
3 SHEETS—SHEET 2.
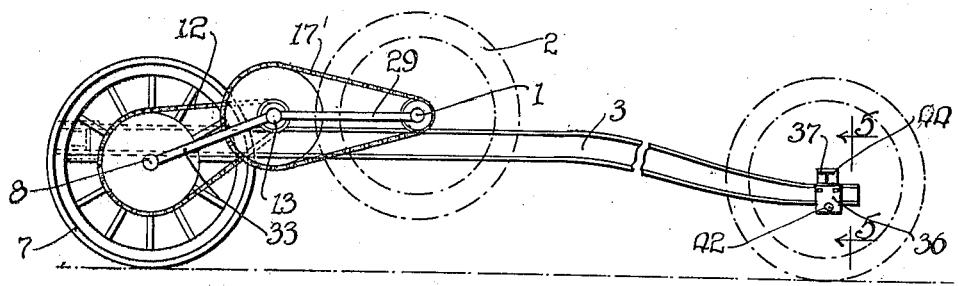
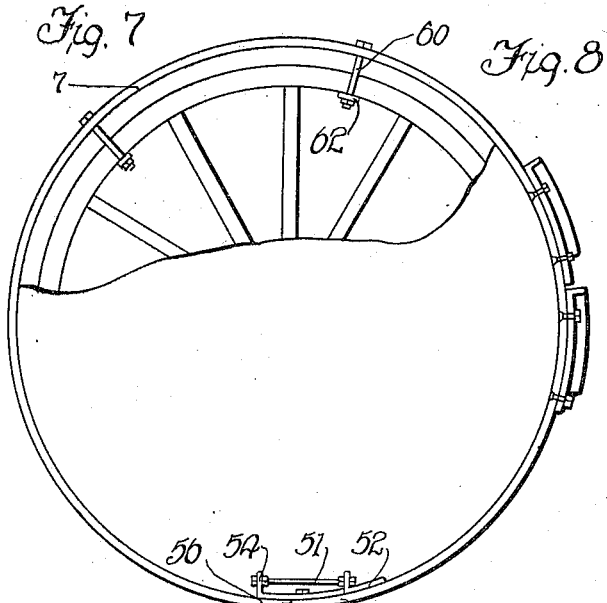
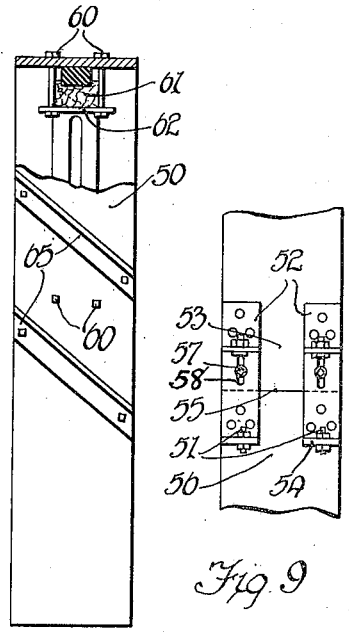
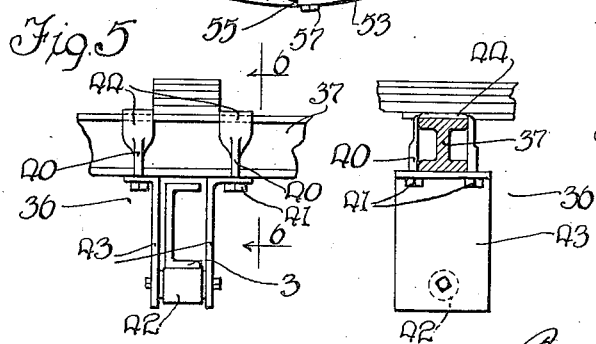
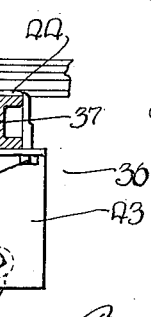
Inventor
Claus G. Rydeen

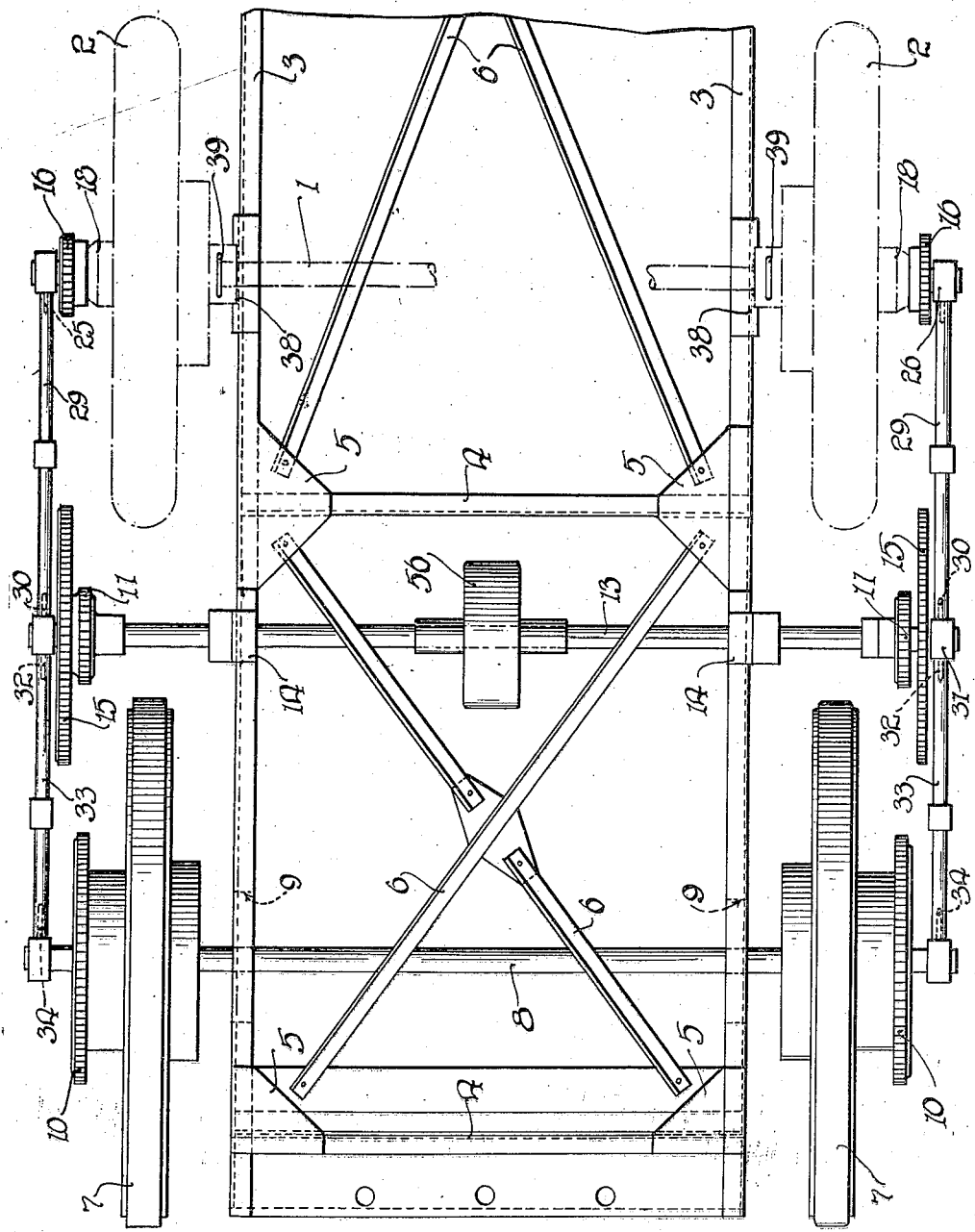

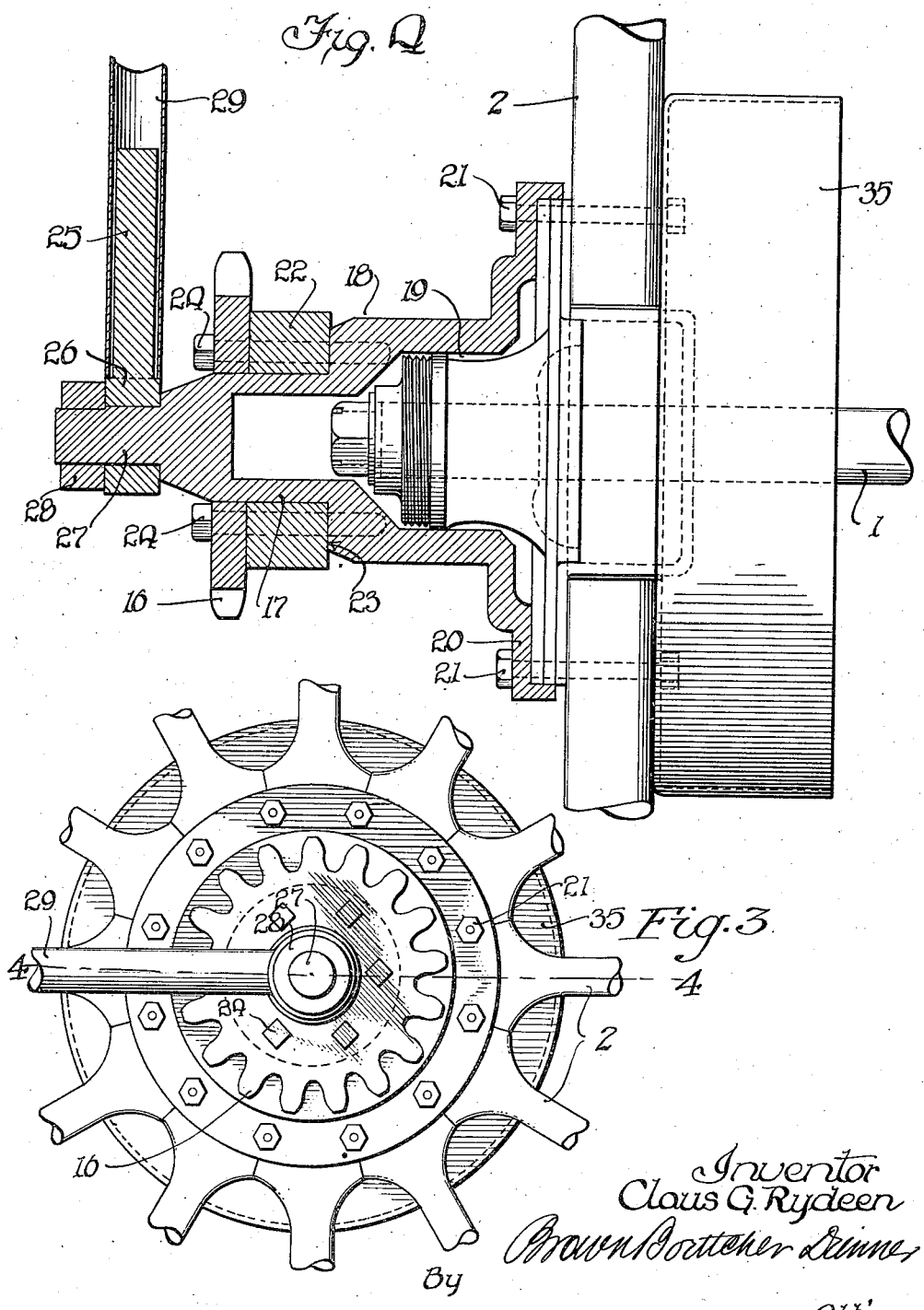

Patented Feb. 13, 1923.

1,445,241

UNITED STATES PATENT OFFICE.

CLAUS G. RYDEEN, OF CHICAGO, ILLINOIS.

DRIVING ATTACHMENT.

Application filed June 30, 1921. Serial No. 481,558.

*To all whom it may concern:*

Be it known that I, CLAUS G. RYDEEN, a citizen of the United States, residing at Chicago, in the county of Cook and State of Illinois, have invented a certain new and useful Improvement in Driving Attachments, of which the following is a full, clear, concise, and exact description, reference being had to the accompanying drawings, forming a part of this specification.

My invention relates to driving attachments for motor vehicles, more particularly to such attachments as are adapted for converting a pleasure or business car into a truck, tractor or the like.

My invention aims to provide a novel, simple, compact and inexpensive attachment for quickly and conveniently converting a pleasure or business car into a truck, tractor or the like without the employment of a skilled mechanic and with a minimum of alteration of the motor vehicle.

A further aim of my invention is the provision of an efficient transmission of the driving effort from the engine of the car to the drive wheels of the attachment at a reduction in speed.

Certain constructional features of my invention are novel and important and these with a detachable arrangement for insuring proper traction on soft or plowed ground are made the subject matter of some of the appended claims.

In the accompanying drawings:

Figure 1 is a fragmentary top plan view of an attachment embodying my invention, showing in dot and dash lines the rear wheels of the motor vehicle as positioned upon the frame thereof;

Figure 2 is a side elevational view of the same;

Figure 3 is an enlarged face view of one of the attachment driving caps which are in the particular embodiment shown substituted for the hub caps of the motor vehicle;

Figure 4 is a horizontal sectional view taken substantially on the line 4—4 of Figure 3;

Figure 5 is an enlarged vertical sectional view taken substantially on the line 5—5 of Figure 2;

Figure 6 is a vertical sectional view taken on the line 6—6 of Figure 5;

Figure 7 is a side elevational view of one of the attachment wheels, showing the detachable arrangement for insuring proper traction on soft or plowed ground;

Figure 8 is a front elevational view partially in section of the same; and

Figure 9 is a top plan view of the connection provided between the opposite ends of the wheel encircling band shown in Figures 7 and 8.

Referring now to the drawings, 1 designates the drive axle of a motor vehicle, on the opposite ends of which the usual drive or traction wheels 2—2 are mounted. The particular type or make of the motor vehicle is immaterial in so far as my invention is concerned, such modifications and changes as may be desirable in adapting the invention to the various sizes and designs of motor vehicles being contemplated and permissible within the scope of the invention, which is set out in the appended claims.

The driving attachment embodying the present invention includes a frame or carriage comprising longitudinal frame members 3, between which a plurality of transverse frame members 4 extend, suitable gusset plates 5 being provided at the various junctures of the frame members. The frame thus provided is additionally braced or stayed by suitable diagonally extending bracing members 6 as shown.

The drive or traction wheels which are substituted for the drive wheels of the motor vehicle upon operatively connecting the attachment thereto are shown at 7—7 being suitably mounted upon the opposite ends of an axle or shaft 8 journaled adjacent its opposite ends in bearings 9 carried by the longitudinal frame member 3. A pair of sprockets 10—10, one mounted upon each of the opposite ends of the shaft or axle 8 are drivingly connected with cooperating sprockets 11 by suitable drive chains 12 trained thereover. The sprockets 11 are fixed upon a shaft 13 journaled in bearings 14 mounted upon the longitudinal frame members 3 forwardly of the attachment or wheel carrying axle 8. A second pair of sprockets 15 on the shaft 13 are drivingly connected with drive sprockets 16 by suitable drive chains 17 trained thereover. While, of course, not necessarily the sprockets 10, 11, 15 and 16 are preferably so proportioned that a reduction in speed is had from the pinions 16 to the pinions 15 while a second reduction in speed is had from the pinions 11 to the pinions 10 and consistently to the wheels 7 of the attachment.

The sprockets 16 are mounted upon the outer spindle or hub portion 17 of cap members 18, one of which is substituted for each of the usual hub caps provided upon the opposite ends of the axle 1. The formation of the members 18 might even be such that they may be mounted over the usual hub caps with which the drive shaft of the motor vehicle is provided. In such event, none of the parts of the vehicle to be converted into a truck or tractor would have to be removed or otherwise altered. The entire motor vehicle would be used as a unit. Even in the particular embodiment shown, the only parts removed or altered are the hub caps on the opposite ends of the drive axle. The particular cap members shown is cored at 19 (Figure 4) to receive the spindle portion projecting outwardly from the wheel 2. The inner end of the cap member 18 terminates in an annular flange portion 20 (Figures 3 and 4) through which flange portion 20 the entire member 18 is securely attached to the wheel 2 as by means of a plurality of bolts 21 or other suitable means. Referring to Figures 3 and 4, it will be seen that the hub portion 17 upon which the sprocket 16 is mounted is reduced and that a spacing sleeve 22 is provided between the shoulder 23 thereby provided and the inner face of the sprocket 16. Bolts 24 extending through the sprocket 16, and sleeve 22 and threaded into the enlarged hub portion of the member 18 securely clamp the sprocket 16 and sleeve 22 in place.

A radially extending stud or pin 25 is provided with a sleeved hub portion 26 mounted upon the reduced end 27 of the member 18 and secured in place by a retaining nut 28 pinned or otherwise secured thereto. The radially projecting stud 25 extends or is telescoped into one end of a tubular member 29 into the opposite end of which a stud 30 having a sleeved or hub portion 31 mounted upon the end of the shaft 13 projects. The tubular member 29 thereby forms a spacing sleeve for bracing and maintaining the proper spaced relation between the projecting ends of the shafts 13 and 1. A second stud or pin 32 projecting from the member 31 extends into one end of a similar sleeve or tube 33 into the opposite end of which a stud 34 mounted upon the end of the shaft 8 projects, thereby maintaining the proper spaced relation between the projecting ends of the shafts 8 and 13. The opposite ends of each of the shafts 1, 8 and 13 are similarly spaced. The mounting of the sprocket 16 is such that they may be readily replaced. By providing sprockets positioned nearer the outer face of the wheel 7 such sprockets may be connected through a suitable drive chain directly with the sprocket 10 on the shaft 8, in which event the shaft 13 could be dispensed with. Consistently, a gear or other suitable drive directly between the shafts 1 and 8 is contemplated.

The reference character 35 designates a brake drum, for cooperation with which brake shoes or other suitable brake means is usually provided.

In attaching the driving attachment to the vehicle, the vehicle is backed or otherwise positioned upon the longitudinal frame member 3 of the attachment frame substantially as shown. The forward ends of the frame members 3 are inserted into hanger brackets 36 suspended from the front axle 37 of the vehicle, movement of the vehicle and attachment frame longitudinally together moving the member 3 forwardly through these hangers and the rear axle 1 into substantially the position shown in Figure 1.

Each of the hangers 36 comprises a pair of angle brackets 43 between the lower ends of which a roller 42 is journaled, the forward end of the frame member 3 being arranged between bracket members 43 and upon this roller 42 as shown. The upper ends of the bracket members 43 are clamped to the under surface of the front axle by straps 40, the opposite ends of which are threaded to engage suitable nuts 41 while the intermediate portions are flattened for co-operation with the sides and upper surface of the axle, about which the straps extend at the opposite sides of the spring arranged thereover. The frame members 3 are provided with suitable bearings 38 for the axle 1 at which bearings the entire vehicle is then locked by means of a U-shaped member 39 against longitudinal displacement relative the attachment frame.

The sprockets 15, 16, 11 and 10 upon being arranged in place are connected by the chains 12 and 17 as hereinbefore set out. When the engine of the motor vehicle is started and the drive is transmitted to the rear axle 1 the shaft 13 is driven preferably although not necessarily at a reduced speed through the chains 17 and the attachment wheels 7 at a further reduced speed through the chains 12. Should it be desired to use the motor vehicle without the attachment of my invention, the only change necessary is removal of the cap members 18 and substitution of the usual hub caps therefor. Such change may be had quickly and conveniently and without the aid of a skilled mechanic.

To insure proper traction on soft or plowed ground, for instance, I have provided attachments which may be quickly and conveniently applied to and removed from the attachment wheels 7. These comprise a band 50 adapted for arrangement about the tires of the wheels 7. The band 50 is cut apart transversely within its circumference as shown at 55 so that it may be spread sufficiently for a convenient placement upon the wheels 7 and then clamped securely about the tire thereof. A pair of connecting bolts 51 are secured at one end in angle brackets 52 fixed to the end 53 of the band 50. Brackets 54 fixed to the end 56 of the band 50 carry the opposite ends of the clamping bolts 51. Bolts 57 extend radially from the end 56 of the band 50 through slots 58 in the end 53 to guide the free ends upon expansion and contraction of the band. The band 50 is additionally secured against transverse displacement by bolts 60 which extend radially along opposite sides of the felloe 61 and engage at their inner ends in plates 62. The wheel 7 extends between the bolts 60 and between the pairs of bracket plates 54 and 52. Traction cleats or tread plates 65 of any suitable or preferred type are arranged around the outer periphery of the band 50.

The shaft 13 may be provided with a power take-off pulley 56 from which power may be taken for extraneous use.

I claim:

1. In combination, a wheel having a projecting hub adapted to receive a hub cap, a power transmission device adapted for arrangement over said hub and interchangeable with the hub cap, said device including a hub portion bearing on the wheel hub at a point removed from the wheel along the axis thereof, a radial flange at one end of said hub portion, said flange being adapted for clamping to the wheel at a point removed radially from the axis thereof, a spacing member attached to the opposite end of the device and a driving sprocket mounted upon the device between the connection with the spacing member and the radial flange.

2. In combination, a wheel having a hub portion adapted to receive a hub cap, a power transmission device interchangeable with the hub cap, said device including a hub portion bearing on the wheel at a point axially removed from the wheel and a radial flange adapted to be clamped to the wheel at point radially removed from the hub portion thereof, a spacing member attached to the opposite end of the device, the hub portion of the device being reduced within its length to provide a radial shoulder, a driving sprocket or gear mounted upon the reduced hub portion of the device and a spacing member mounted upon said hub portion between said sprocket or gear and the radial shoulder to secure the desired axial positioning of the gear or sprocket thereon.

3. In combination, a power transmission device interchangeable with the hub cap of a vehicle wheel, said device comprising a hub portion reduced within its length and provided with a radial shoulder, a driving sprocket or gear mounted upon said reduced hub portion and a spacing member mounted upon said hub portion between said sprocket or gear and the radial shoulder to secure the desired axial positioning of the gear or sprocket thereon.

4. In a combination, a motor vehicle having a drive axle and associated drive wheels, sprockets of relatively small diameter at the opposite ends of said drive axle outwardly beyond the drive wheels associated therewith, an attachment frame having traction wheels and a common jack shaft having sprockets of relatively large diameter at its opposite ends, driving chains trained over said first and second sprockets to transmit the driving effort of the vehicle to the common jack shaft, sprockets of relatively small diameter on the jack shaft adjacent the relatively large sprockets thereon, sprockets of relatively large diameter arranged outwardly beyond the wheels of the traction frame and drivingly connected therewith, driving chains trained over the relatively small sprockets on the jack shaft and said last sprockets to transmit the driving effort to the wheels of the attachment, the drive axle of the motor vehicle, jack shaft and the traction wheel shaft of the attachment having radially projecting studs adjacent their outer ends and longitudinally adjustable members telescopically engaging said studs for maintaining the proper spaced relation of the drive axle, jack shaft and traction wheel shaft and the desired tension of the driving chains.

5. In combination, a wheel having a projecting hub and a face plate surrounding the same, a power transmission device adapted for arrangement over said hub, said device including a radially extending portion adapted to be clamped to said face plate at a point removed from the center of the wheel, said radially extending portion terminating in a flange adapted to embrace the periphery of the face plate and a hub portion bearing on the projecting wheel hub.

6. In combination, a wheel having a projecting hub and a face plate surrounding the same, a power transmission device adapted for arrangement over said hub, said device including a radially extending portion adapted to be clamped to said face plate at a point removed from the center of the wheel, said radially extending portion terminating in a flange adapted to embrace the periphery of the face plate, a hub portion bearing on the projecting wheel hub, said hub portion being reduced to provide a reduced portion and a shoulder, and a sprocket member mounted upon said reduced portion and clamped to said shoulder.

7. In combination, a wheel having a projecting hub, a power transmission device adapted for arrangement over said hub, said device including a radially extending portion having a surface adapted for clamping to the wheel radially outwardly from the hub portion thereof, said surface being recessed about the projecting wheel hub, and a hub portion bearing on the wheel hub at a point axially removed from the clamping surface of said radially extending portion.

8. In combination, a pair of shafts between which power is adapted to be transmitted, a collar on one of said shafts, said collar having a radially projecting pin, a collar on the other shaft, said collar having a radially projecting pin, said pins engaging in the opposite ends of a sleeve member, the opposite ends of said sleeve member cooperating with the respective collars to maintain the proper spaced relation of said shafts.

In witness whereof, I hereunto subscribe my name this 25th day of June, 1921.

CLAUS G. RYDEEN.